US009757651B2

(12) United States Patent
Song et al.

(10) Patent No.: US 9,757,651 B2
(45) Date of Patent: Sep. 12, 2017

(54) ELECTRONIC DEVICE AND METHOD OF PROCESSING USER INPUT BY ELECTRONIC DEVICE

(71) Applicant: Samsung Electronics Co., Ltd., Suwon-si, Gyeonggi-do (KR)

(72) Inventors: Jaeyoung Song, Suwon-si (KR); Jinho Jang, Yongin-si (KR); Ilgeun Bok, Seoul (KR); Sungjun Kim, Suwon-si (KR); Hyukgoo Lee, Seoul (KR); Wooseong Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/476,020

(22) Filed: Sep. 3, 2014

(65) Prior Publication Data
US 2015/0062001 A1    Mar. 5, 2015

Related U.S. Application Data

(60) Provisional application No. 61/874,034, filed on Sep. 5, 2013.

(30) Foreign Application Priority Data

Dec. 5, 2013    (KR) .......................... 10-2013-0150769

(51) Int. Cl.
*G06F 3/023* (2006.01)
*A63F 13/48* (2014.01)
(Continued)

(52) U.S. Cl.
CPC ............ *A63F 13/48* (2014.09); *A63F 13/235* (2014.09); *A63F 13/352* (2014.09); *A63F 13/42* (2014.09);
(Continued)

(58) Field of Classification Search
CPC ...... G06F 3/023; G06F 3/1423; A63F 13/235; A63F 13/352; A63F 13/42; A63F 13/48;
(Continued)

(56) References Cited

U.S. PATENT DOCUMENTS

2005/0245314 A1    11/2005    Pirich et al.
2006/0068910 A1    3/2006    Schmidt et al.
(Continued)

FOREIGN PATENT DOCUMENTS

KR    10-1052393 B1    7/2011

OTHER PUBLICATIONS

Anonymous: "PS3 Playstation 3 Instrction Manual", Dec. 31, 2009, XP055355653, Retrieved from the Internet: URL:https://www.playstation.com/manual/pdf/CECH-2001A_2001B-2.85_2.pdf [retrieved on Mar. 16, 2017].

(Continued)

*Primary Examiner* — Tony Davis
(74) *Attorney, Agent, or Firm* — Jefferson IP Law, LLP

(57) ABSTRACT

A method of processing a user input by an electronic device is provided. The method includes receiving a signal from an auxiliary electronic device, providing application information related to the auxiliary electronic device based on the signal, and identifying a program configured to receive a control signal transmitted from the auxiliary electronic device based on the application information.

24 Claims, 15 Drawing Sheets

(51) Int. Cl.
  *G08C 17/02* (2006.01)
  *G06F 3/14* (2006.01)
  *A63F 13/42* (2014.01)
  *A63F 13/235* (2014.01)
  *A63F 13/352* (2014.01)

(52) U.S. Cl.
  CPC ............ G06F 3/1423 (2013.01); G08C 17/02 (2013.01); *A63F 2300/552* (2013.01); *G09G 2330/021* (2013.01); *G09G 2370/10* (2013.01); *G09G 2370/12* (2013.01); *G09G 2370/16* (2013.01); *G09G 2380/02* (2013.01)

(58) Field of Classification Search
  CPC .............. A63F 2300/552; G08C 17/02; G09G 2330/021; G09G 2370/10; G09G 2370/12; G09G 2370/16; G09G 2380/02
  USPC ...................................... 345/157–158; 463/29
  See application file for complete search history.

(56) References Cited

U.S. PATENT DOCUMENTS

| | | | |
|---|---|---|---|
| 2009/0309831 A1* | 12/2009 | Sun | G06F 3/0346 345/158 |
| 2010/0087241 A1 | 4/2010 | Nguyen et al. | |
| 2011/0086711 A1* | 4/2011 | Dunko | A63F 13/12 463/41 |
| 2011/0263202 A1* | 10/2011 | Lee | H04M 1/7253 455/41.2 |
| 2012/0105348 A1 | 5/2012 | Lampell et al. | |
| 2012/0238360 A1* | 9/2012 | Pirogov | A63F 3/00643 463/31 |
| 2012/0262370 A1* | 10/2012 | Ko | G06F 3/03547 345/157 |
| 2012/0274661 A1 | 11/2012 | Ye et al. | |
| 2012/0319989 A1 | 12/2012 | Argiro | |
| 2013/0023248 A1* | 1/2013 | Lee | H04W 4/026 455/414.1 |
| 2013/0106687 A1 | 5/2013 | Baum et al. | |
| 2013/0169418 A1* | 7/2013 | Seo | G06K 7/0008 340/10.1 |
| 2013/0174094 A1* | 7/2013 | Heo | G06F 3/04883 715/835 |
| 2013/0174137 A1* | 7/2013 | Kim | G06F 8/65 717/171 |
| 2014/0011584 A1* | 1/2014 | Shin | A63F 13/06 463/31 |
| 2014/0032787 A1* | 1/2014 | Avasthi | G06F 1/3203 710/6 |
| 2014/0213349 A1* | 7/2014 | Lin | G06F 21/31 463/29 |
| 2015/0198676 A1* | 7/2015 | Min | G01R 31/3679 320/114 |

OTHER PUBLICATIONS

Anonymous: "How to Access Netflix on PlayStation 3", Jul. 6, 2013, XP055355660, Retrieved from the Internet: URL:http://web.archive.org/web/20130706003852/ http://www.wikihow.com/Access-Nettlix-on-PlayStation-3 [retrieved on Mar. 16, 2017].

* cited by examiner

ELECTRONIC DEVICE AND METHOD OF PROCESSING USER INPUT BY ELECTRONIC DEVICE

CROSS-REFERENCE TO RELATED APPLICATION(S)

This application claims the benefit under 35 U.S.C. §119(e) of a U.S. Provisional application filed on Sep. 5, 2013 in the U.S. Patent and Trademark Office and assigned Ser. No. 61/874,034, and under 35 U.S.C. §119(a) of a Korean patent application filed on Dec. 5, 2013 in the Korean Intellectual Property Office and assigned Serial number 10-2013-0150769, the entire disclosure of each of which is hereby incorporated by reference.

TECHNICAL FIELD

The present disclosure relates to an electronic device and a method of processing a user input by an electronic device. More particularly, the present disclosure relates to an electronic device for receiving a user input signal generated by an auxiliary electronic device and controlling a function.

BACKGROUND

In general, recently developed electronic devices, such as smart phones, tablet Personal Computers (PC), Portable Multimedia Players (PMP), Personal Digital Assistants (PDA), laptop PCs, and wearable devices, for example, wrist watches, a Head-Mounted Displays (HMD), and the like may perform not only a phone call function but also various other functions (for example, games, Social Network Service (SNS), Internet, multimedia, and taking and displaying a picture or a video).

Since an electronic device has a limited size, it was difficult to add a plurality of physical input means, such as a keypad or a controller, to the electronic device in the related art.

The above information is presented as background information only to assist with an understanding of the present disclosure. No determination has been made, and no assertion is made, as to whether any of the above might be applicable as prior art with regard to the present disclosure.

SUMMARY OF THE INVENTION

Aspects of the present disclosure are to address at least the above-mentioned problems and/or disadvantages and to provide at least the advantages described below. Accordingly, an aspect of the present disclosure is to provide an electronic device and a method of processing a user input signal by an electronic device, and to provide a method of receiving a user input signal generated by an auxiliary electronic device including a physical input means, such as a keypad or a controller, and processing the user input signal.

In accordance with an aspect of the present disclosure, a method of processing a user input by an electronic device is provided. The method includes receiving a signal from an auxiliary electronic device, providing application information related to the auxiliary electronic device based on the signal, and identifying a program configured to receive a control signal transmitted from the auxiliary electronic device based on the provided application information.

In accordance with another aspect of the present disclosure, an electronic device is provided. The electronic device includes a communication unit, a memory unit, a display unit, and a processor. The processor is configured to receive a signal from an auxiliary electronic device through the communication unit, to provide application information related to the auxiliary electronic device based on the signal, and to identify a program configured to receive a control signal transmitted from the auxiliary electronic device based on the provided application information.

In accordance with another aspect of the present disclosure, a method of processing a user input signal by an electronic device is provided. The method includes receiving a user input signal through a first button from an auxiliary electronic device, executing a first application based on the user input signal, and receiving a user input signal through a second button from the auxiliary electronic device and executing a second application included in the first application.

In accordance with another aspect of the present disclosure, an electronic device is provided. The electronic device includes a communication unit, a memory unit, a display unit, and a processor. The processor is configured to receive a user input signal through a first button from an auxiliary electronic device through the communication unit, to execute a first application based on the user input signal, to receive a user input signal through a second button from the auxiliary electronic device, and to execute a second application included in the first application.

An electronic device and a method of processing a user input by an electronic device according to various embodiments of the present disclosure can allow a user to feel more sensations through their fingers and further immerse the user in the use of content by processing a user input signal received from an auxiliary electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents It is to be understood that the singular forms "a," "an," and "the" include plural referents unless the context clearly dictates otherwise. Thus, for example, reference to "a component surface" includes reference to one or more of such surfaces.

Figure 1:
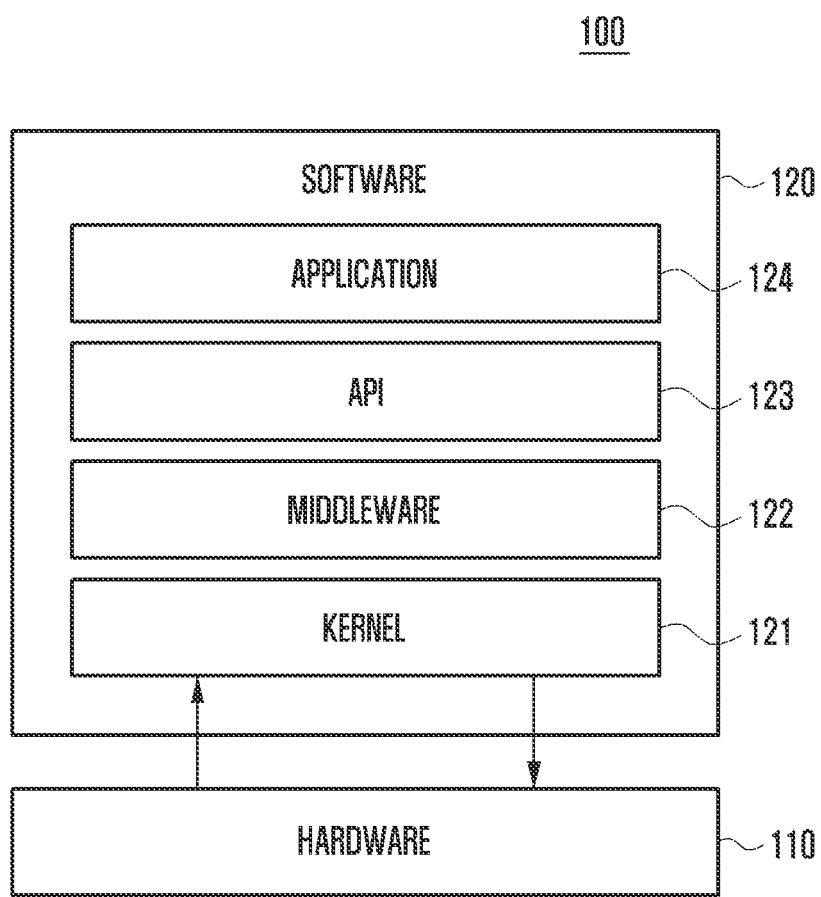
FIG. 1 schematically illustrates a configuration of an electronic device according to various embodiments of the present disclosure.

FIG. 1 is a block diagram schematically illustrating a configuration of an electronic device 100 according to various embodiments of the present disclosure.

Referring to FIG. 1, the electronic device 100 may include hardware 110 or software 120. A description of an embodiment of the hardware 110 will be provided through FIG. 2. The software 120 may include a kernel 121, middleware 122, an Application Programming Interface (API) 123, or an application 124, and a detailed description of an embodiment of the software 120 will be provided through FIG. 3.

The electronic device may be, for example, an electronic watch, a refrigerator, an air conditioner, a vacuum cleaner, an artificial intelligence robot, a TeleVision (TV), a Digital Video Disk (DVD) player, an audio, an oven, a microwave oven, a washing machine, an electronic bracelet, an electronic necklace, an air cleaner, an electronic picture frame, various medical equipment (e.g., a Magnetic Resonance Angiography (MRA), a Magnetic Resonance Imaging (MRI), a Computed Tomography (CT) scanning machine, an ultrasonic machine), a navigation device, a black box, a set-top box, an electronic dictionary, an automotive device, a shipbuilding device, an aeronautic device, a security appliance, an electronic clothing, an electronic key, an agricultural, livestock, and fishery device, a desktop Personal Computer (PC), a laptop PC, a Personal Digital Assistant (PDA), a Portable Multimedia Player (PMP), a tablet PC, a mobile phone, a video phone, a smart phone, an e-book reader, a camera, a wearable device, a wireless device, a Global Positioning System (GPS) receiver, a hand-held device, a digital audio player, a camcorder, a game console, a wrist watch, a Head-Mounted Display (HMD), a flat panel device, a digital picture frame, an electronic board, an electronic signature receiving device, a projector or the like. It is obvious to those skilled in the art that the electronic device according to the present disclosure is not limited to the aforementioned devices.

Figure 2:
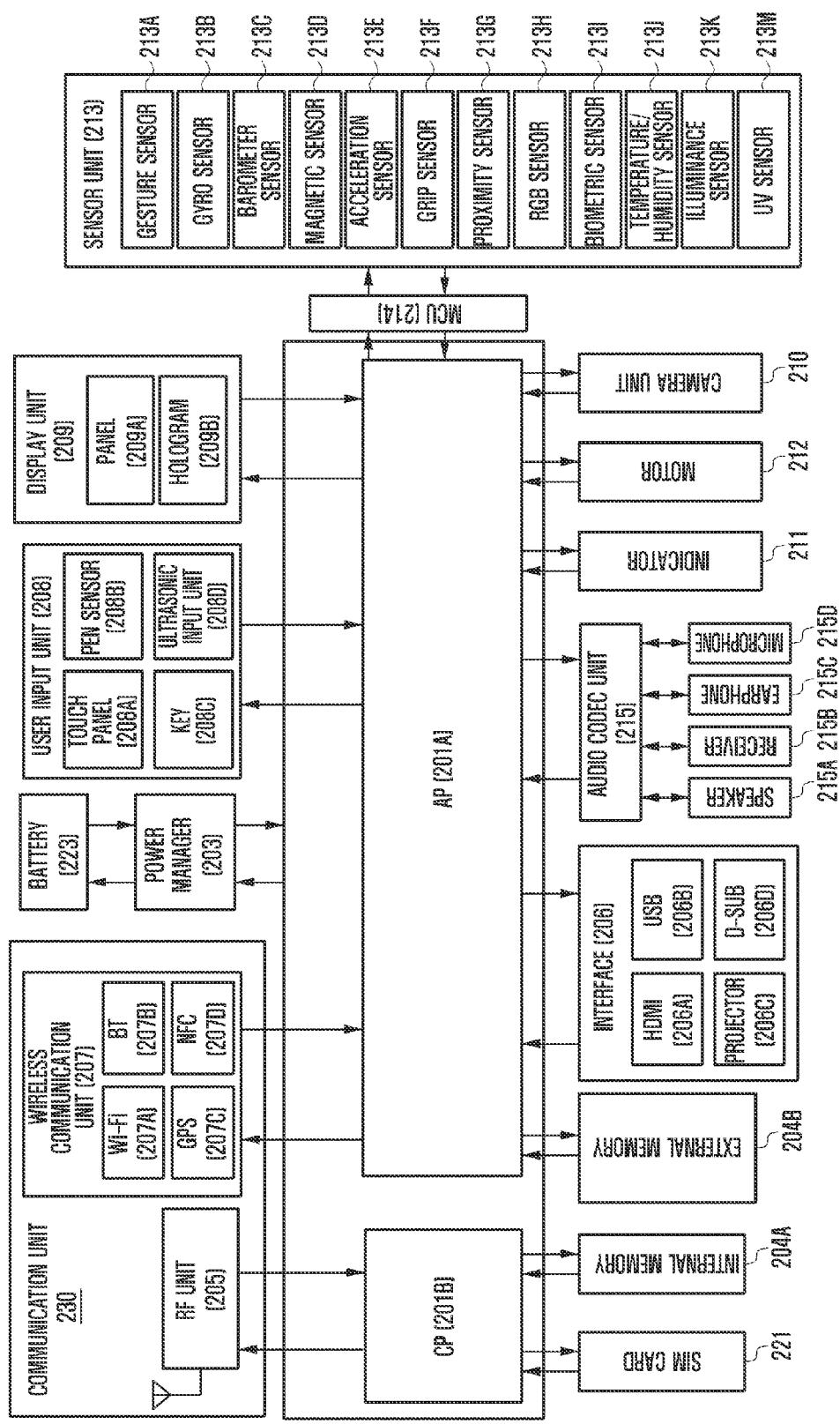
FIG. 2 schematically illustrates a configuration of hardware according to various embodiments of the present disclosure.

FIG. 2 is a block diagram schematically illustrating a configuration of hardware 200 (for example, the hardware 110 of FIG. 1) according to various embodiments of the present disclosure.

Referring to FIG. 2, the hardware 200 may include one or more processors 201. For example, as illustrated in FIG. 2, the processors may include one or more Application Processors (APs) 201A and one or more Communication Processors (CPs) 201B. The AP 201A controls a plurality of hardware or software components connected to the AP 201A by driving an operating system or an application program and may be implemented as a processor which can process various pieces of data including multimedia data and perform calculation, for example, as a System on Chip (SoC). According to an implementation, the processors 201 may further include a Graphic Processing Unit (GPU) (not shown).

The CP 201B may be implemented as a processor which performs communication functions of an electronic device (for example, the electronic device 100 of FIG. 1) including the hardware 200 (for example, the hardware 110 of FIG. 1), for example, as a SoC. According to an implementation, the CP 201B may perform at least a part of a multimedia control function. Further, the CP 201B may perform differentiation and authentication of a terminal within a communication network by using a subscriber identification module such as a Subscriber Identification Module (SIM) card 221, and may provide a user with services including a voice call, a video call, a text message, packet data and the like. In addition, the CP 201B may control data transmission/reception of a Radio Frequency (RF) unit 205. In FIG. 2, a component, such as the CP 201B, a power manager 203, or a memory 204, is illustrated as a component separated from the AP 201A, but the AP 201A may include at least some (for example, the CP 201B) of the above-described components according to any embodiment.

The RF unit 205 performs data transmission/reception, for example, transmission/reception of an RF signal or a called electronic signal. Although not illustrated, the RF unit 205 may include, for example, a transceiver, a Power Amp Module (PAM), a frequency filter, a Low Noise Amplifier (LNA) and the like. Further, the RF module 205 may further include a component for transmitting/receiving an electromagnetic wave in a free space in a wireless communication, for example, a conductor, a conductive wire and the like.

The hardware 200 may include an internal memory 204A or an external memory 204B. The internal memory 204A may include at least one of a volatile memory (for example, a Dynamic Random Access Memory (DRAM), a Static RAM (SRAM), a Synchronous Dynamic RAM (SDRAM) and the like) or a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM and the like). According to an embodiment, the AP 201A or the CP 201B may load a command or data received from at least one of a non-volatile memory and other components connected to each of the AP 201A and the CP 201B in a volatile memory, and may process the loaded command or data. Further, the AP 201A or the CP 201B may store data received from or generated by other components in the non-volatile memory.

The external memory 204B may further include, for example, a Compact Flash (CF), a Secure Digital (SD), a Micro Secure Digital (Micro-SD), a Mini Secure Digital (Mini-SD), an extreme Digital (xD), a memory stick or the like.

The power manager 203 may manage power of the hardware 200. Although not illustrated, the power manager 203 may include, for example, a Power Management Integrated Circuit (PMIC), a charger Integrated Circuit (IC), or a battery gauge. The PMIC may be mounted in, for example, an integrated circuit or a SoC semiconductor. Charging methods may be classified into a wired charging method and a wireless charging method. The charger IC may charge a battery and prevent over voltage or over current from being flowed in from a charger. At this time, the charger IC may include a charger IC for at least one of the wired charging method and the wireless charging method. The wireless charting method includes, for example, a magnetic resonance scheme, a magnetic induction scheme, an electromagnetic scheme or the like, and an additional circuit for wireless charging, such as a coil loop circuit, a resonance circuit, a rectifier circuit and the like may be added. The battery gauge may measure at least one of a residual quantity of a battery 223, and a voltage, a current, or a temperature during the charging. The battery 223 may generate electricity to supply power and may be, for example, a rechargeable battery.

An interface 206 may include at least one of, for example, a High Definition Multimedia Interface (HDMI) 206A, a Universal Serial Bus (USB) 206B, a projector 206C, a D-subminiature (D-sub) 206D, a Secure Digital (SD)/MultiMedia Card (MMC) (not shown), and Infrared Data Association (IrDA) (not shown).

A communication unit 230 may provide a wireless communication function using a wireless communication unit 207 that may include at least one of WiFi 207A, BlueTooth (BT) 207B, a Global Positioning System (GPS) 207C, and Near Field Communication (NFC) 207D. Additionally or alternatively, the communication unit 230 may include a network interface (for example, a Local Area Network (LAN) card) or a modem for connecting the hardware 200 with a network (for example, Internet, LAN, Wire Area Network (WAN), a telecommunication network, a cellular network, a satellite network, a Plain Old Telephone Service (POTS) or the like).

A user input unit 208 may receive various commands from a user. The user input unit 208 may include at least one of, for example, a touch screen panel 208A, a (digital) pen sensor 208B, a key 208C, and an ultrasonic input unit 208D. The touch screen panel 208A may recognize a touch input, for example, in at least one type of a capacitive type, a resistive type, an infrared type, and an acoustic wave type. Further, the touch screen panel 208A may further include a controller (not shown). In the capacitive type, the touch screen panel 208A can recognize proximity as well as a direct touch. The touch screen panel 208A may further include a tactile layer. In this case, the touch screen panel 208A may provide a tactile reaction to a user. The (digital) pen sensor 208B may be implemented by using, for example, the same method as that of receiving a user's touch input or a separate sheet for recognition. For example, a keypad or a touch key may be used as the key 208C. The ultrasonic input device 208D is a device which can detect an acoustic wave by a microphone (for example, microphone 215D) of the terminal through a pen generating an ultrasonic signal to identify data and can perform wireless recognition. According to various embodiments, the hardware 200 may also receive a user input from an external device (for example, a network, a computer, or a server) connected with the communication unit 230, by using the communication unit 230.

A display unit 209 is a device for displaying images or data to a user, and may be, for example, a panel 209A or a hologram 209B. For example, a Liquid Crystal Display (LCD) or an Active Matrix Organic Light Emitting Diode (AM-OLED) may be used as the panel 209A. At this time, a controller for controlling the panel 209A may be further included. The panel 209A may be implemented to be, for example, flexible, transparent, or wearable. The panel 209A may also be configured as one module together with the touch screen panel. The hologram 209B may show a three dimensional image in the air by using light interference.

A camera unit 210 may photograph a still image and a moving image, and may include one or more image sensors (for example, a front lens or a rear lens), Image Signal Processors (ISPs) (not shown), or a flash Light Emitting Diode (LED) (not shown) according to an implementation.

An indicator 211 may show particular statuses of the hardware 200 or a part (for example, the AP 201A) of the hardware, for example, a booting status, a message status, a charging status and the like. A motor 212 may convert an electrical signal into a mechanical vibration.

A sensor unit 213 may include, for example, a gesture sensor 213A, a gyro sensor 213B, a barometer sensor 213C, a magnetic sensor 213D, an acceleration sensor 213E, a grip sensor 213F, a proximity sensor 213G, a Red, Greed, and Blue (RGB) sensor 213H, a biometric sensor 213I, a temperature/humidity sensor 213J, an illuminance sensor 213K, an UltraViolet (UV) sensor 213M, an E-nose sensor (not shown), an Electromyography (EMG) sensor (not shown), an Electroencephalogram (EEG) sensor (not shown), an Electrocardiogram (ECG) sensor (not shown), a finger print sensor, or any other similar and/or suitable sensor. According to an implementation, the hardware 200 may further include a Micro Controller Unit (MCU) 214 for controlling the sensor unit 213. An audio codec 215 may bilaterally convert a voice and an electrical signal. The audio codec 215 may convert voice information input or output through, for example, a speaker 215A, a receiver 215B, earphones 215C, a microphone 215D or the like. Although not illustrated, the hardware 200 may include a processing unit (for example, GPU) for supporting a mobile TV. The processing unit for supporting the mobile TV may process media data according to a standard of Digital Multimedia Broadcasting (DMB), Digital Video Broadcasting (DVB), media flow or the like.

Names of the aforementioned components of the hardware according to the present disclosure may vary depending on the type of electronic device, and the hardware according to the present disclosure may include at least one of the aforementioned components. Some components may be removed from the hardware or other additional components may be further included in the hardware.

Figure 3:
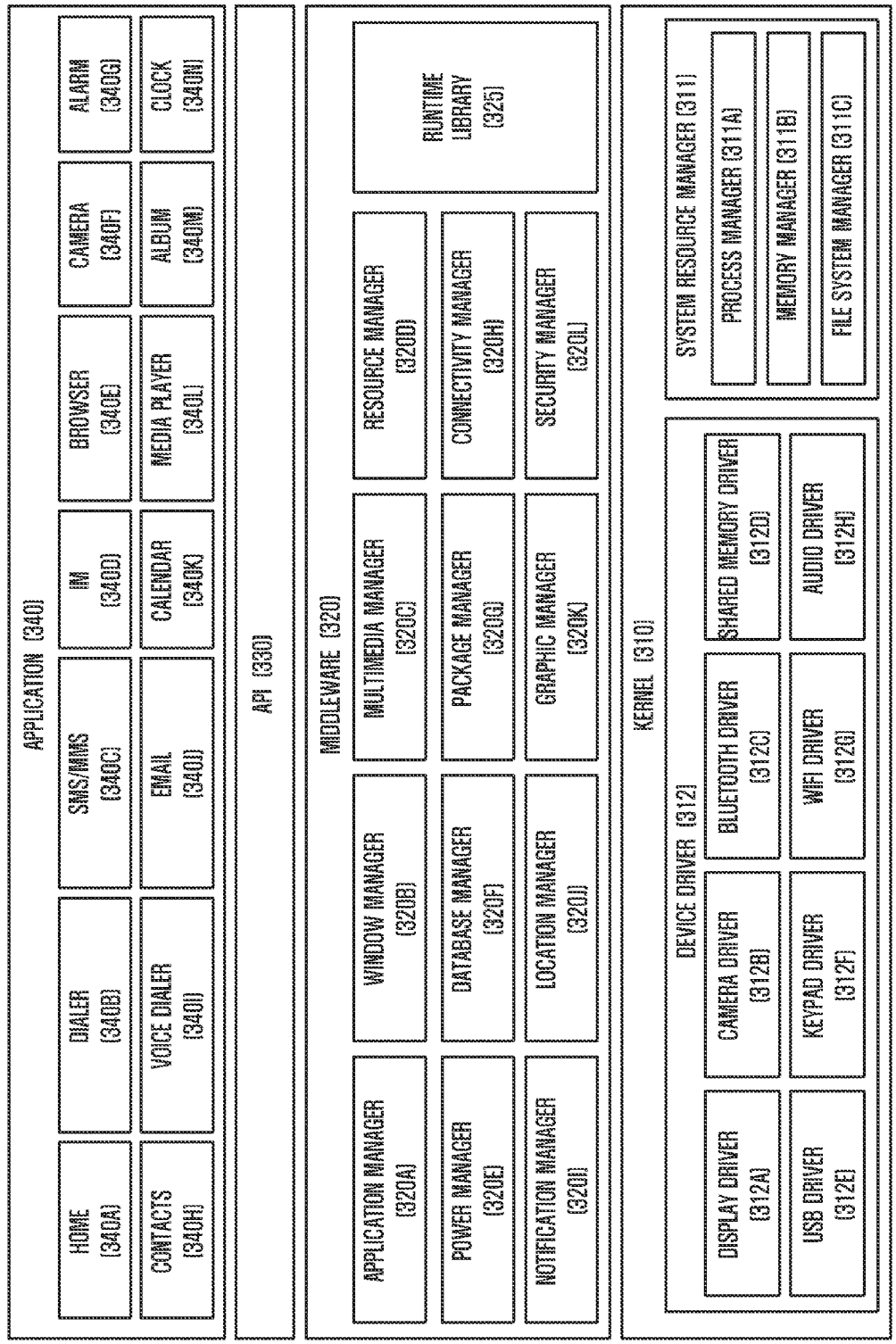
FIG. 3 schematically illustrates a configuration of software according to various embodiments of the present disclosure.

FIG. 3 schematically illustrates a configuration of software 300 (for example, the software 120) according to various embodiments of the present disclosure. The software 300 may include an Operating System (OS) implemented in hardware (for example, the hardware 200) to control resources related to the electronic device (for example, the electronic device 100) or various applications (for example, applications 340) executed on the operating system. The operating system may be, for example, Android, iOS, Windows, Symbian, Tizen, Bada or the like.

A kernel 310 may include a system resource manager 311 that can manage resources and a device driver 312. For example, the system resource manager 311 may include a processor manager 311A, a memory manager 311B, or a file system manager 311C and may control, allocate, or withdraw system resources.

The device driver 312 enables control of various components of hardware (for example, the hardware 200) of the corresponding electronic device (for example, the electronic device 100) through software access. To this end, although not illustrated, the device driver 312 may be classified into, for example, an interface and an individual driver module provided by each of hardware manufacturers. For example, the device driver 312 may include at least one of a display driver 312A, a camera driver 312B, a Bluetooth driver 312C, a shared memory driver 312D, a USB driver 312E, a keypad driver 312F, a Wi-Fi driver 312G, an audio driver 312H, and an Inter-Process Communication (IPC) driver (not shown).

Middleware 320 may include a plurality of modules implemented in advance to provide commonly used functions for various applications. The middleware 320 may provide the commonly used functions through an API 330 such that the applications 340 may efficiently use restricted system resources within the electronic device. The middleware 320 may include one or more of a plurality of modules, for example, an application manager 320A, a window manager 320B, a multimedia manager 320C, a resource manager 320D, a power manager 320E, a database manager 320F, and a package manager 320G.

The application manager 320A may manage a life cycle of at least one of the applications 340. The window manager 342 may manage GUI resources used on the screen. The multimedia manager 320C may figure out formats used for reproduction of various media files, and may perform encoding or decoding of the media file by using a codec suitable for the corresponding format. The resource manager 320 may manage resources such as a source code, a memory, or a storage space of at least one of the applications 340. The power manager 320 may operate together with a Basic Input/Output System (BIOS) to manage a battery or power and provide power information used for the operation. The database manager 320F may manage generation, search, or change of a database to be used by at least one of the applications 340. The package manager 320G may manage installation or update of an application distributed in the form of package file.

According to an implementation, the middleware 320 may include at least one of a connectivity manager 320H, a notification manager 320I, a location manager 320J, a graphic manager 320K, and a security manager 320L.

The connectivity manager 320H may manage, for example, a wireless connection such as WiFi or Bluetooth. The notification manager 320I may display or notify of an event such as an arrival message, appointment, proximity notification and the like in such a way that a user is not disturbed. The location manager 350 may manage location information of the electronic device. The graphic manager 320K may manage a graphic effect which will be provided to a user and a user interface related to the graphic effect. The security manager 320L may provide all security functions used for system security or user authentication.

When the electronic device (for example, the electronic device 100) has a phone call function, the middleware 320 may further include a telephony manager (not shown) for managing a voice or video call function of the electronic device.

According to various embodiments, the middleware 320 may include a run-time library 325 or other library modules (not shown). The run-time library 325 is a library module that a compiler uses in order to add a new function through a programming language while an application is being executed. For example, the run-time library 325 may execute input/output, the management of a memory, a function associated with an arithmetic function or the like. The middleware 320 may generate a new middleware module through a combination of various functions of the aforementioned internal component modules and use the generated new middleware module. The middleware 320 may provide a module specified for each type of operating system to provide a differentiated function.

Further, the middleware 320 may dynamically remove some of the existing components or add new components. Accordingly, the middleware 320 may exclude some of the components described in the embodiments of the present disclosure, further include other components, or substitute the components with components having a different name and performing a similar function.

The API 330 corresponds to a set of API programming functions, and may be provided to have a different configuration according to the OS. When the OS corresponds to Android or iOS, for example, one API set may be provided for each platform. When the OS corresponds to Tizen, for example, two or more API sets may be provided.

The applications 340 may indicate one or more application programs implemented in the corresponding electronic device (for example, the electronic device 100) by using the API 330. The applications 340 may include, for example, a preloaded application or a third party application. The applications 340 may include at least one of, for example, a home application 340A for returning to a home screen, a dialer application 340B, a Short Message Service (SMS)/Multi-media Messaging Service application (MMS) 340C, an Instant Message (IM) application 340D, a browser application 340E, a camera application 340F, an alarm application 340G, contacts (or address book) application 340H, a voice dialer application 340I, an email application 340J, a calendar application 340K, a media player application 340L, an album application 340M, and a clock application 340N.

The names of the above-described components of the software according to the present disclosure may vary depending on the type of operating system. Further, the software according to the present disclosure may include one or more of the aforementioned components or may further include other additional components, or some of the aforementioned components may be omitted.

Figure 4:
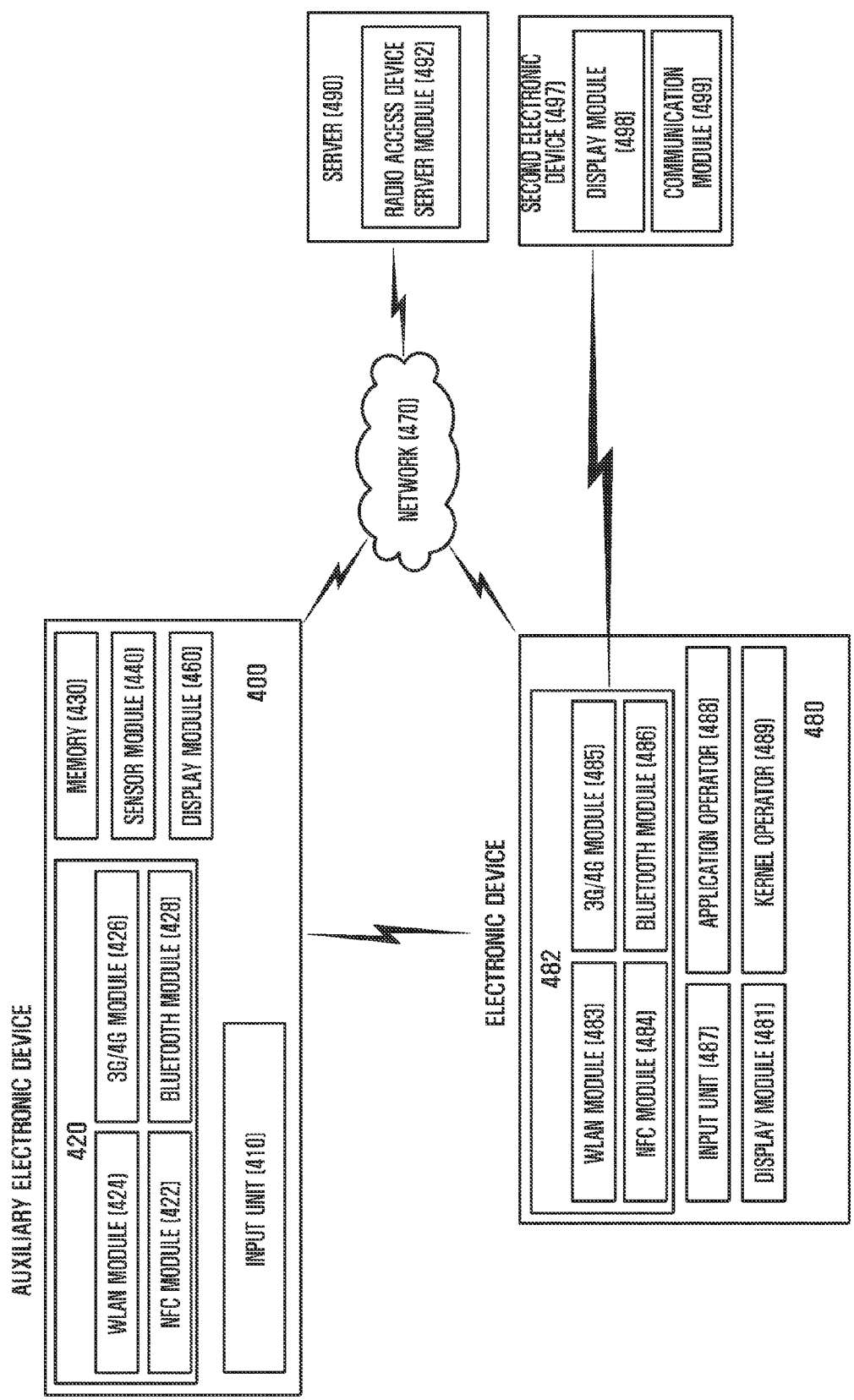
FIG. 4 illustrates a network environment between an auxiliary electronic device and an electronic device according to various embodiments of the present disclosure.
Figure 5:
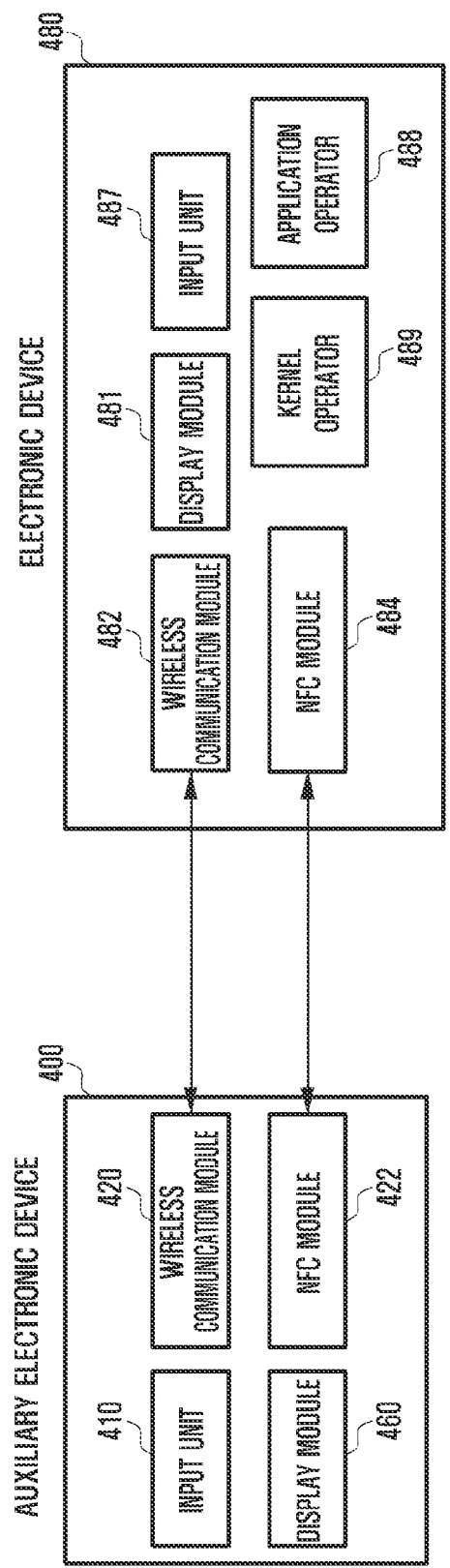
FIG. 5 illustrates an internal configuration for a connection between an auxiliary electronic device and an electronic device according to various embodiments of the present disclosure.
Figure 9:
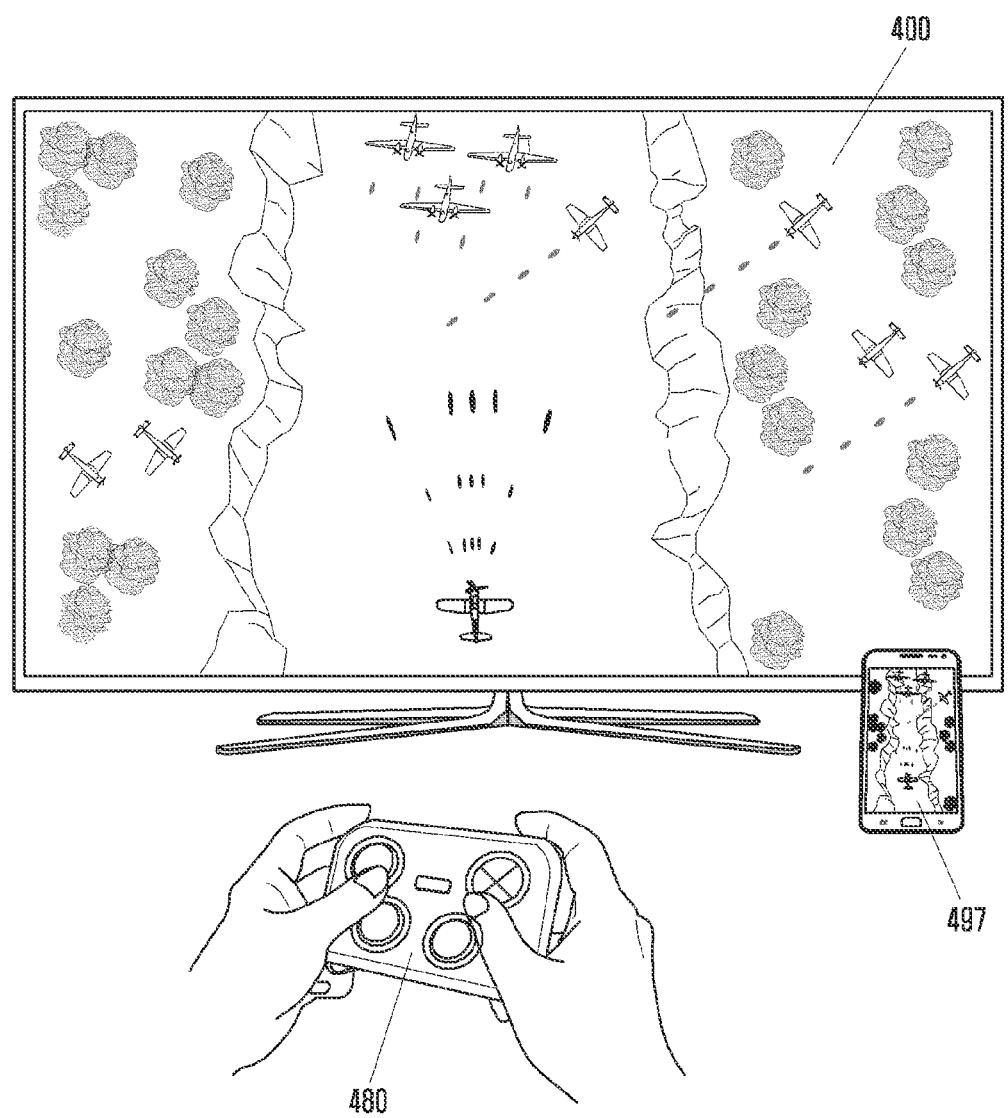
FIG. 9 illustrates an operation of processing a user input signal between an auxiliary electronic device, an electronic device, and a second electronic device which can display a screen according to various embodiments of the present disclosure.

FIG. 4 illustrates a network environment between an auxiliary electronic device 400 and an electronic device 480 according to various embodiments of the present disclosure, FIG. 5 illustrates an internal configuration for a connection between the auxiliary electronic device 400 and the electronic device 480 according to various embodiments of the present disclosure, and FIG. 9 illustrates an operation of processing a user input signal between the auxiliary electronic device 400, the electronic device 480, and a second electronic device which can display a screen according to various embodiments of the present disclosure. According to FIG. 9, a screen controlled by the electronic device 480 and the auxiliary electronic device 480 may be displayed by a second electronic device 497. The following description will be made with reference to FIGS. 4, 5, and 9.

For example, the electronic device 480 and/or the auxiliary electronic device 400 may include the hardware 200.

According various embodiments, the electronic device 480 may authenticate the auxiliary electronic device 400 to be connected with the auxiliary electronic device 400. For example, the electronic device 480 may exchange authentication information with the auxiliary electronic device 400 by using an NFC module 422 and may authenticate the auxiliary electronic device 400 based on the authentication information. Based on the authentication of the auxiliary electronic device 400, the electronic device 480 and the auxiliary electronic device 400 may be connected to communicate. For example, the electronic device 480 and the auxiliary electronic device 400 may be Bluetooth-connected through Bluetooth modules 428 and 486 to transmit/receive data.

According to an embodiment, the auxiliary electronic device 400 and the electronic device 480 may exchange connection information (for example, a device name, a Bluetooth device address, and a device class) by using NFC and may perform a profile connection through Bluetooth based on the exchanged connection information. Information and a module for using the NFC may be installed on the rear surface of the auxiliary electronic device 400 and/or the electronic device 480, but the present disclosure is not limited thereto and the information and the module may be installed in any position of the auxiliary electronic device 400 and/or the electronic device 480.

Referring to FIGS. 4 and 5, the auxiliary electronic device 400 and the electronic device 480 may receive a particular application (for example, a curation program) and/or application information related to the auxiliary electronic device 400 from a server 490 through a network 470. The server 490 may include a radio access device server module 492. The NFC module 422 of the electronic device 480 may include an NFC reader which can read NFC authentication and an NFC tag which can transmit NFC authentication. The NFC module 422 of the auxiliary electronic device 400 may include an NFC reader which can read NFC authentication and an NFC tag which can transmit NFC authentication.

A user input made in the auxiliary electronic device 400 may be received through an input unit 410 and then transmitted to the electronic device 480 through a communication module 420 of the electronic device 400. The communication module 420 may include a Bluetooth module 428, a WLAN module 424, a 3G/4G module 426, an NFC module 422, and any other similar and/or suitable communication module. The electronic device 480 may control operations (for example, application execution, game control and the like) of the electronic device 480 by using the received user input.

According to various embodiments, the electronic device 480 may display a screen of the second electronic device 497 through a communication module 499 of the second electronic device 497 by using a communication module 482 of the electronic device 480. The communication module 482 may include a Bluetooth module 486, a WLAN module 483, a 3G/4G module 485, an NFC module 484, and any other similar and/or suitable communication module. The second electronic device 497 may be an electronic device including a display module 498 such as a TV, a portable computer, or a computer, and the electronic device 480 may transmit a displayed screen to the second electronic device 497.

The auxiliary electronic device 400 may further include a memory 430, a sensory module 440, and a display module 460. In addition, the auxiliary electronic device 400 may further include a battery (not shown) which may supply power to the electronic device 480. The auxiliary electronic device 400 may be connected to the electronic device 480 through a wire to supply power. Further, the auxiliary electronic device 400 may receive power used for communication (for example, power used for short-range communication) with the electronic device 480 through a battery (not shown) and may supply power to the electronic device 480. The auxiliary electronic device 400 may further include a speaker (not shown) which may output a sound output from the electronic device 480. The auxiliary electronic device 400 may output a sound output from the electronic device 480 through a speaker (not shown) and the speaker may be earphones. The electronic device 480 may include a display module 481, an input unit 487, an application operator 488, and a kernel operator 489.

The auxiliary electronic device 400 may have a pad form such as a game controller, so that the user may conveniently grasp the auxiliary electronic device 400. Further, a part of the auxiliary electronic device 400 which the user holds may be covered by an elastic and soft material (for example, polyurethane) or may be made of elastic and soft material so that the user may conveniently grasp the auxiliary electronic device 400.

Figure 6:
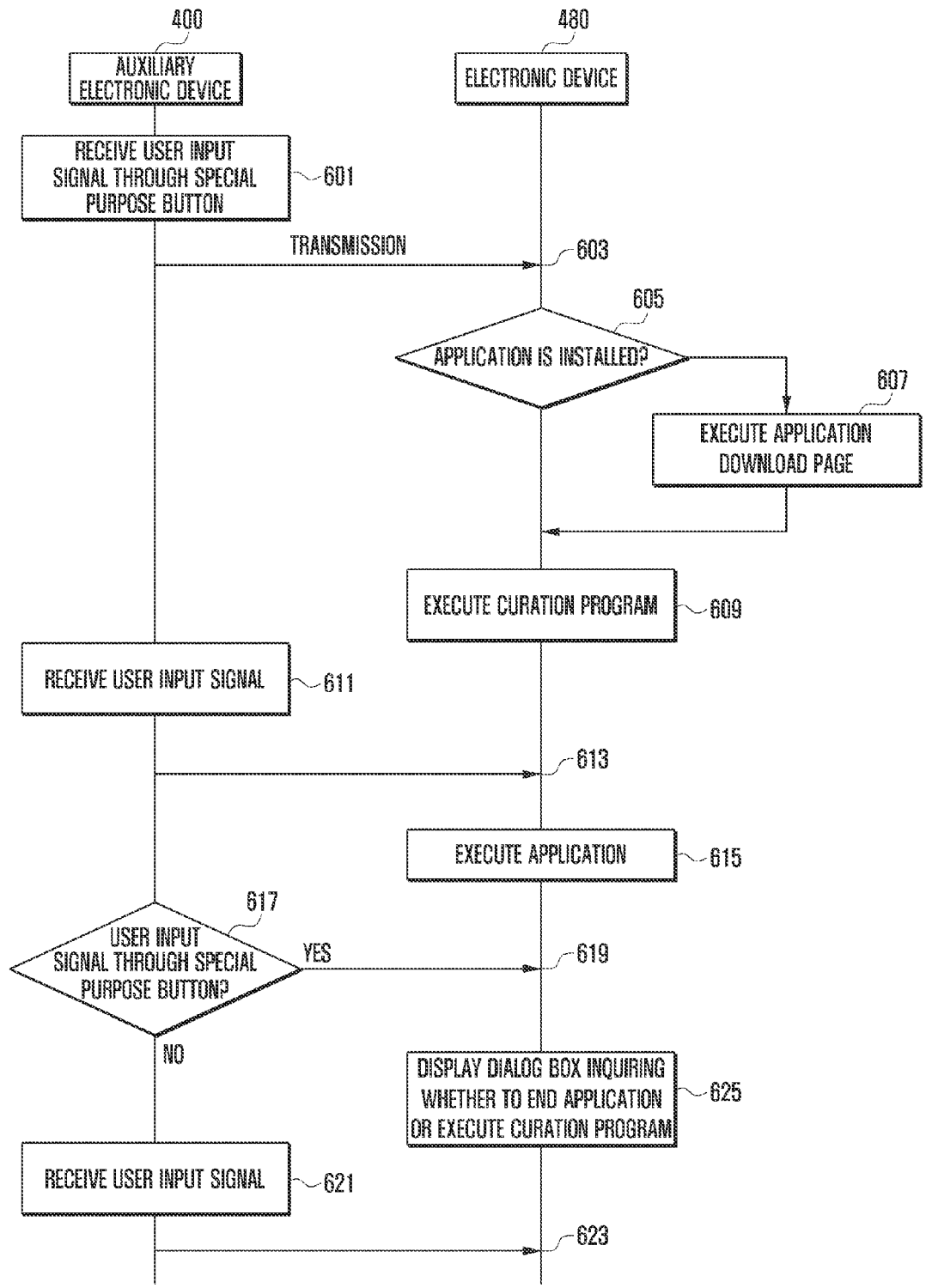
FIG. 6 is a signal flowchart between an auxiliary electronic device and an electronic device to process a user input according to various embodiments of the present disclosure.

FIG. 6 is a signal flowchart between the auxiliary electronic device and the electronic device to process a user input according to various embodiments of the present disclosure.

The auxiliary electronic device 400 may receive a user input for pressing a special purpose button disposed on the auxiliary electronic device (for example, the auxiliary electronic device 400) in operation 601. The auxiliary electronic device 400 may receive a user input signal through the special purpose button disposed on the auxiliary electronic device (for example, the auxiliary electronic device 400) in operation 601. For example, the auxiliary electronic device 400 may include a "G" button for executing a game and the user may process the "G button (Game button)" for executing the game. In another embodiment of the present disclosure, the special purpose button may be not only a physical key pad, but also a Graphical User Interface (GUI) displayed on a touch panel when the auxiliary electronic device 400 includes the touch panel which can detect a touch input of the user.

In operation 603, a user input signal based on the pressing of the special purpose button may be transmitted to the electronic device (for example, the electronic device 480). The electronic device 480 may identify whether an application which can process an application execution signal (for example, a game application execution signal) is installed, based on the user input signal through the special purpose button. For example, in operation 603, the user input signal based on the pressing of the special purpose button may be transmitted to an input framework of the electronic device 480. The electronic device 480 may transmit the user input signal transmitted to the input framework to a user interface framework of the electronic device 480 and identify whether an application which can process an application execution signal (for example, a game application execution signal) is installed, based the user input signal. For example, the user interface framework of the electronic device 480 may identify whether the application which can process the application execution signal (for example, the game application execution signal) is installed by using application authentication information (for example, an application ID) of the user pre-stored in a memory. The electronic device 480 may identify whether a curation program (for example, a game-dedicated curation program) or an application download program (for example, Samsung apps, Android market, or Apple store execution program) is installed, based on the application execution signal (for example, the game application execution signal) in operation 605. When the curation program (for example, the game-dedicated curation program) is installed, the electronic device 480 may execute the curation program in operation 609. For example, the curation program may be a first application (for example, a game-dedicated application) and the application executed according to the application execution signal may be a second application (for example, a game application). The first application may be an application including a list or a thumbnail image of one or more second applications.

When the curation program or the application download store program is not installed, the electronic device 480 may display a page through which both the curation program and the application download store program can be downloaded in operation 607. The curation program or the application download program may be downloaded in the download page based on a user input and then installed in the electronic device 480.

In an embodiment, when the application download store program is installed but the curation program is not installed, the electronic device 480 may display a page through which the curation program can be downloaded in operation 607. Based on the user input, the curation program may be downloaded in the download page and then installed in the electronic device 480.

When the curation program is installed, the electronic device 480 may proceed to operation 609 to execute the curation program (for example, the game-dedicated curation program). For example, the curation program (for example, the game-dedicated curation program) may be a curation application (for example, a game-dedicated curation application). The curation program refers to an application which provides an application which can perform an input and a control of the auxiliary electronic device 400 among applications (for example, applications registered in an application market, such as Samsung apps, Android market, Apple store and the like) which can be installed in the electronic device 480. For example, when the curation program is the game-dedicated curation program, the curation program may be an application which gathers links of game applications supporting an input and a control of the auxiliary electronic device 400 and selectively provides the links to the user such that the user downloads and/or installs the game applications in the electronic device 480 and/or the auxiliary electronic device 400. For example, the game application supporting the input and the control of the auxiliary electronic device 400 may vary depending on the device (for example, the type of auxiliary electronic device 400 or electronic device 400).

According to various embodiments, a list and/or a download link of the game-dedicated application which can be executed may be displayed in a screen of the curation program (for example, the game-dedicated curation program). The download link may refer to a link which is registered in the application market such as Samsung apps. According to another embodiment, when the curation program (for example, the game-dedicated curation program) has been already installed in the electronic device 480 and the application (for example, the game application) which can process the application execution signal has not been installed in operation 605, the electronic device 480 may display the list and/or the download link for the application (for example, the game application) which can be executed.

The auxiliary electronic device 400 may receive an input signal from the user in operation 611. In operation 613, the electronic device 480 may receive a user input signal from the auxiliary electronic device 400. The electronic device 480 may execute an application (for example, the game application) according to the user input signal from the auxiliary electronic device 400 in operation 615. For example, the electronic device 480 may receive a selection of a desired game among a list of game applications according to the user input signal and then download the selected game application or play a pre-installed game in operation 615.

When the download link is selected, the electronic device 480 may be linked to a Samsung apps download page where a corresponding content (for example, the game application) exists and download the content in operation 613.

During the execution of the application (for example, the game application), the auxiliary electronic device 400 may determine whether a user input signal is received through a special purpose button (for example, the "G" button) in operation 617.

When there is no user input signal through the special purpose button (for example, the "G" button), the auxiliary electronic device 400 may receive a user input signal by another input button, not the special purpose button in operation 621. The auxiliary electronic device 400 may transmit the user input signal by another input button, not the special purpose button, to the electronic device 480 in operation 623. In an embodiment, the special purpose button and another input button which is not the special purpose button may be at least one button included in the auxiliary electronic device 400. For example, the special purpose button may be a first button included in the auxiliary electronic device 400 and another input button which is not the special purpose button may be a second button included in the auxiliary electronic device 400.

The electronic device 480 may receive a user input signal through the special purpose button in operation 619. The electronic device 480 may display a dialog box which inquires whether to end the game application being executed, based on the user input signal through the special purpose button in operation 625. Based on the user input for the dialog box, a screen of the curation program (for example, the game-dedicated curation program) may be displayed. In another embodiment, the electronic device 480 may display the screen of the curation program based on the user input signal through the special purpose button in operation 625.

Figure 7:
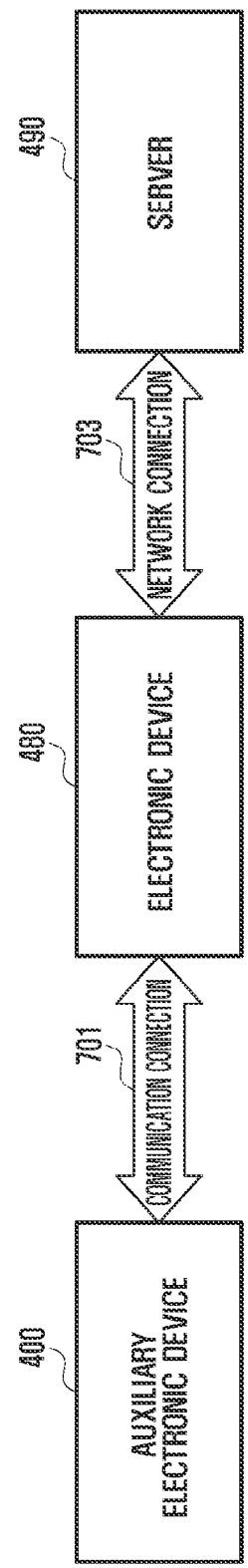
FIG. 7 illustrates an operation between an auxiliary electronic device, an electronic device, and a server according to various embodiments of the present disclosure.

FIG. 7 illustrates an operation between the auxiliary electronic device 400, the electronic device 480, and the server 490 according to various embodiments of the present disclosure.

The auxiliary electronic device 400 and the electronic device 480 may be connected to communicate via communication connection 701. The communication connection between the auxiliary electronic device 400 and the electronic device 480 may be made through Wi-Fi, Bluetooth, or short-range wireless communication. In another embodiment, the communication connection between the auxiliary electronic device 400 and the electronic device 480 may be also made through wired communication such as USB communication.

When the communication connection 701 between the auxiliary electronic device 400 and the electronic device 480 is made, device usage authentication information (Human Interface Device (HID) usage ID) may be transmitted to the electronic device 400 together with the user input signal through the special purpose button. For example, the HID usage ID may be unique identification information between a manufacturer and a product.

When the communication connection 701 between the auxiliary electronic device 400 and the electronic device 480 is made, an input through the electronic device 480 may be refrained, and the electronic device 480 may store authentication information of the user (for example, an Application ID (App ID)) for an application download link such that the electronic device 480 immerses itself in an application (for example, a game application) and search for the application download link through a user input signal (for example, a user input through a direction key) generated by the auxiliary electronic device 400 without a separate input of the auxiliary electronic device 400.

When the communication connection 701 between the auxiliary electronic device 400 and the electronic device 480 is made and an interruption is generated (for example, when an external event such as a message or a call is generated or an alarm is generated), if the user input signal generated through the special purpose button is transmitted to the electronic device 480, the interruption may be blocked.

When one or more other auxiliary electronic devices (not shown) having the same configuration as that of the auxiliary electronic device 400 are connected to the auxiliary electronic device 400 and the electronic device 480 to communicate and the user input signal through the special purpose button is detected by at least one of the auxiliary electronic device 400 and another auxiliary electronic device (not shown), the auxiliary electronic device 400 and another auxiliary electronic device (not shown) may simultaneously control the operation of the electronic device 480. For example, the auxiliary electronic device 400 is executing a game application in which two or more users can participate through the electronic device 480 and another auxiliary electronic device (not shown) transmits a user input signal to the electronic device 480 in response to an input of the special purpose button by the user, the electronic device 480 may perform an operation according to the user input signal of another auxiliary electronic device (not shown) as well as the user input signal of the auxiliary electronic device 400. For example, a genre such as a Massive Multiplayer Online Role Playing Game (MMORPG) or a competition game may have a plurality of users to participate in the game. When the auxiliary electronic device 400 may occupy one character or object of the game application displayed on the electronic device 480 to control the character or object, another auxiliary electronic device (not shown) may occupy another character or object of the game application displayed on the electronic device 480 to control the character or object. Occupation of a character or an object of the game application displayed on the electronic device 480 can be made based on the user input signal through the special purpose button within the auxiliary electronic device 400.

When the communication connection 701 between the auxiliary electronic device 400 and the electronic device 480 is made and the user input signal through the special purpose button is transmitted to the electronic device 480, the electronic device 480 may perform a function of executing an application (for example, the game application). Further, when the user input signal through the special purpose button is transmitted to the electronic device 480 while the game application is executed, the electronic device 480 may pause the execution of the application (for example, the game application). Alternatively, when the user input signal through the special purpose button is transmitted to the electronic device 480 while the application (for example, the game application) is paused, the electronic device 480 may resume the application (for example, the game application).

When the communication connection 701 between the auxiliary electronic device 400 and the electronic device 480 is made, when the electronic device 480 enters a locked screen or a power saving mode, and when the user input signal through the special purpose button is transmitted to the electronic device 480, the electronic device 480 may release the locked screen or the power saving mode. For example, when the communication connection 701 between the auxiliary electronic device 400 and electronic device 480 is made and the electronic device 480 enters the locked screen or the power saving mode, the electronic device 480 may simultaneously release the locked screen or the power saving mode according to the user input signal through the special purpose button and display a curation program on the display. Alternatively, the display of the electronic device 480 is changed from an off state to an on state when the special purpose button of the auxiliary electronic device 400 is pressed, so that the electronic device 480 can operate according to a user input later.

When the communication connection 701 between the auxiliary electronic device 400 and electronic device 480 is made and the user input signal through the special purpose button (for example, a first button) is transmitted to the electronic device 480, the electronic device 480 may block a user input (for example, a touch input or a key input) using a user input unit (for example, a touch screen or a key button) disposed on the electronic device 480.

The electronic device 480 and the server 490 may be connected to each other through the network 470 via a network connection 703. The server 490 may accept an access of the authenticated electronic device 480 to the network and provide a link and a content requested by the electronic device 480.

Figure 8:
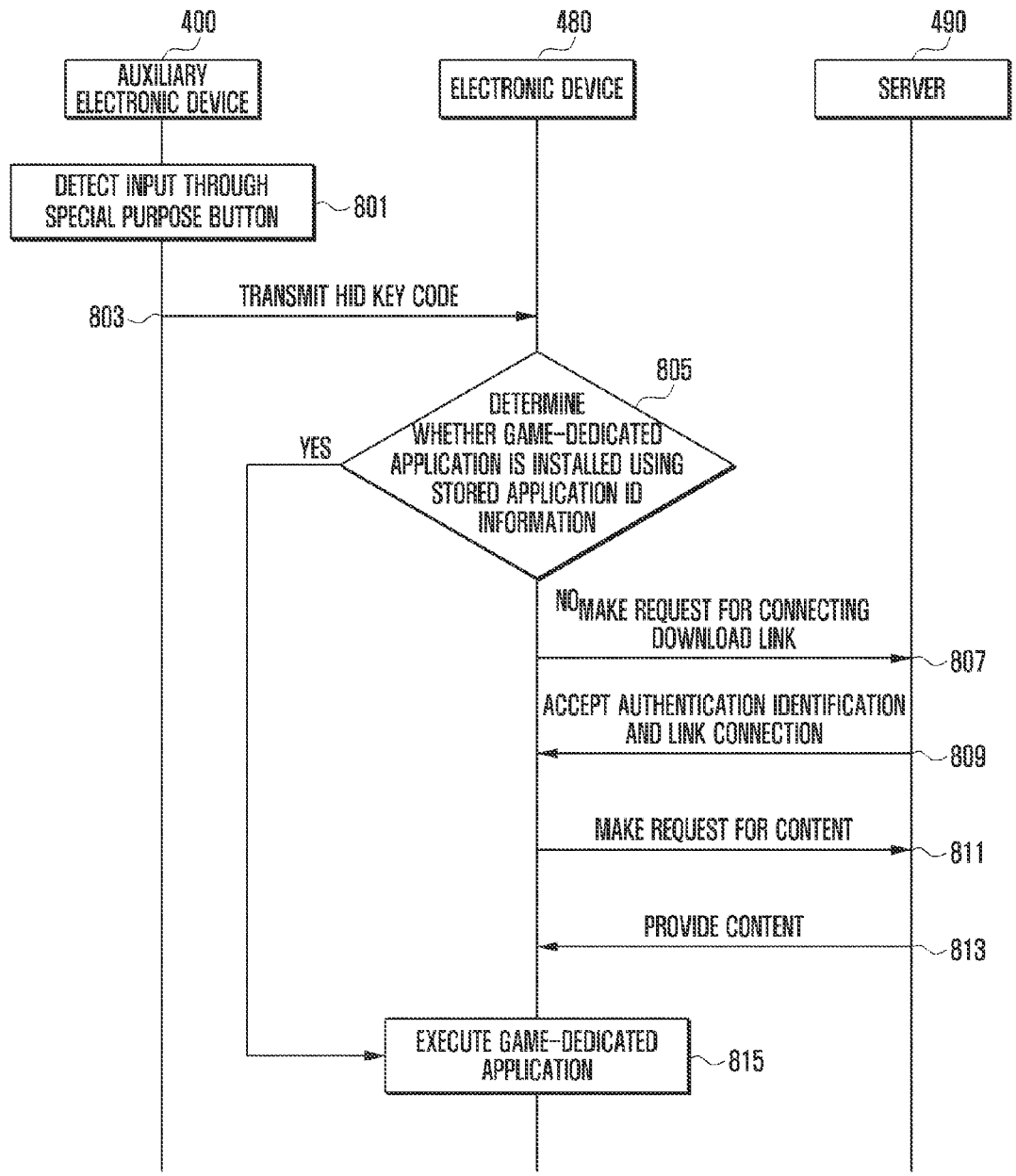
FIG. 8 is a signal flowchart between an auxiliary electronic device, an electronic device, and a server according to various embodiments of the present disclosure.

FIG. 8 is a signal flowchart between the auxiliary electronic device 400, the electronic device 480, and the server 490 according to various embodiments of the present disclosure. For example, the auxiliary electronic device 400 may be a game pad including a physical key pad and the electronic device 480 may be a smart phone.

The auxiliary electronic device 400 may detect a user input signal through the special purpose button (for example, a "G" key) in operation 801. When the user input signal through the special purpose button is detected, the auxiliary electronic device 400 may transmit an HID key code to the electronic device 480 in operation 803. For example, the HID key code may be an authentication code between devices for short-range wireless communication such as Bluetooth. For example, the HID key code may be unique identification information between a manufacturer and a product.

The electronic device 480 may determine whether a game-dedicated application is installed using stored user authentication information (for example, an Application ID (App ID) in operation 805.

When the game-dedicated application is installed, the electronic device 480 may proceed to operation 815 to execute the game-dedicated application. When the game-dedicated application is not installed, the electronic device 480 may proceed to operation 807 to make a request for a download link to the server 490. In response to the request for the download link by the electronic device 480, the server 490 may transmit a signal for accepting authentication confirmation of user authentication information and the link to the electronic device 480 in operation 809. The electronic device 480 may make a request for providing content to the server 490 in operation 811. For example, the content may be a game application. In response to the request for providing the content by the electronic device 480, the server 490 may provide the content in operation 813. When receiving the content from the server 490, the electronic device 480 may execute the game-dedicated application in operation 815.

Figure 10:
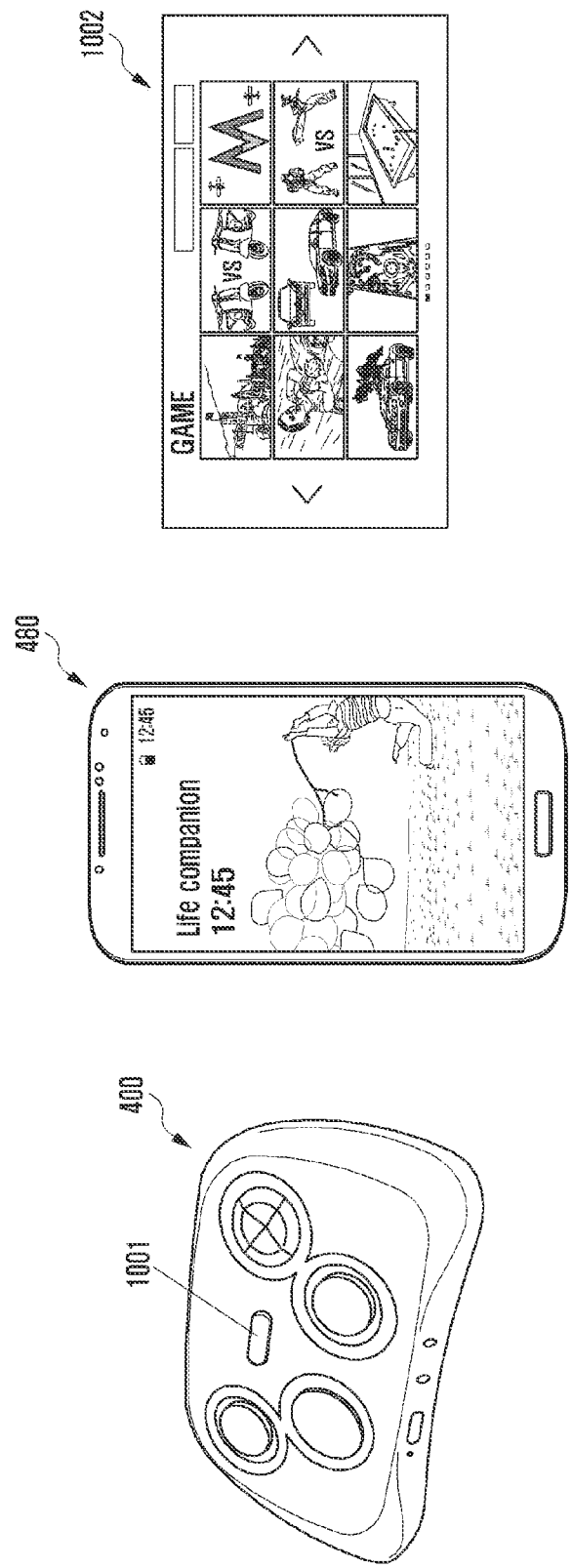
FIG. 10 illustrates an auxiliary electronic device, and electronic device, configuration of a screen of a curation program (for example, a game-dedicated curation program) according to various embodiments of the present disclosure.
Figure 11A:
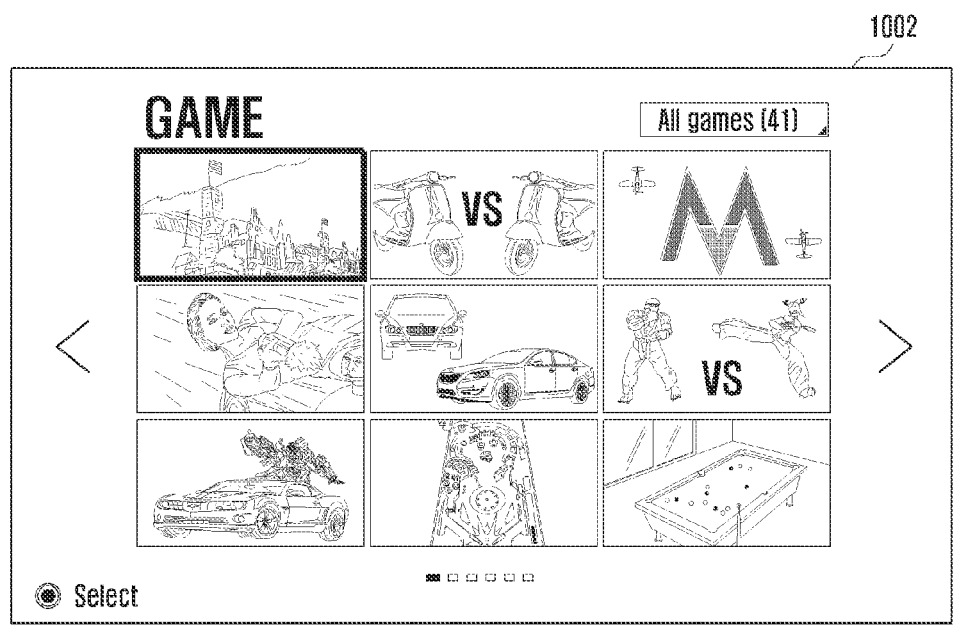
FIGS. 11A and 11B illustrate examples of a game-dedicated curation screen according to various embodiments of the present disclosure.
Figure 11B:
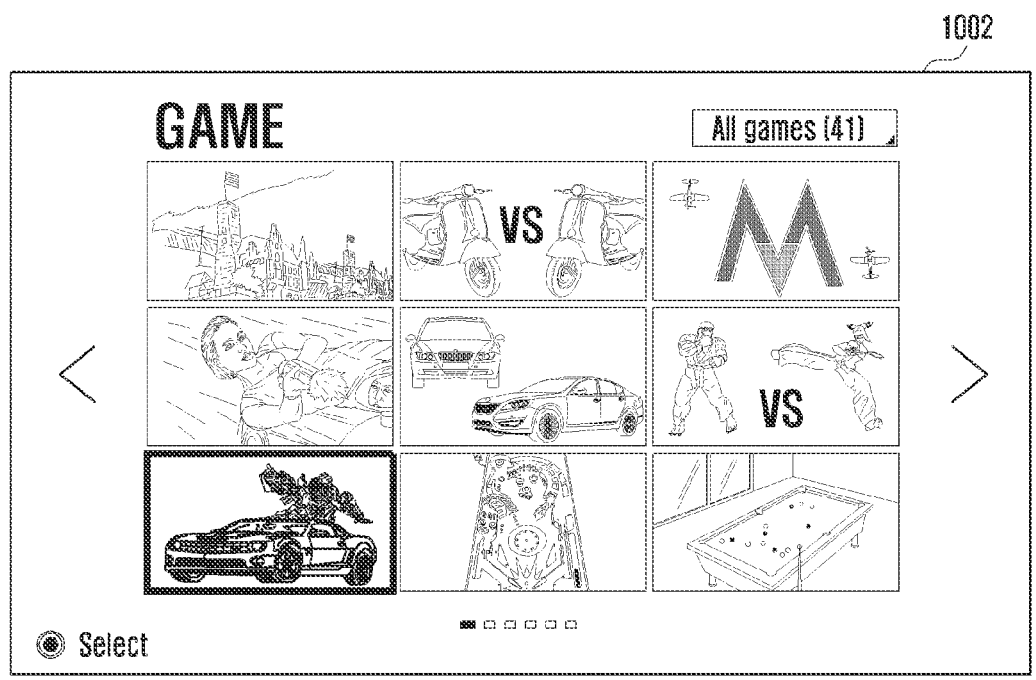

FIG. 10 illustrates the auxiliary electronic device 400, the electronic device 480, and a configuration of a curation program (for example, a game-dedicated curation program) according to various embodiments of the present disclosure, and FIGS. 11A and 11B illustrate examples of execution screens of the curation program according to various embodiments of the present disclosure.

When the user presses a special purpose button 1001 included in the auxiliary electronic device 400, the electronic device 480 may display a game-dedicated curation screen 1002. For example, the curation program (for example, the game-dedicated curation program) refers to an application (app) providing an application which can perform an input and a control of the auxiliary electronic device among applications (for example, apps registered in an application market such as Samsung apps) which can be installed in the electronic device 480. For example, the game-dedicated curation application may be an application which gathers links of game applications supporting an input and a control of the auxiliary electronic device 400 and selectively provides the links to the user such that user downloads and/or installs the game applications in the electronic device 480 and/or the auxiliary electronic device 400. The game-dedicated curation screen 1002 may display gathered links of game application or one or more gathered thumbnail images of game applications.

Referring to FIGS. 11A and 11B, a thumbnail image of a game application which is not installed in the game-dedicated curation screen 1002 may be processed in shadow (for example, black and white image) and a thumbnail image of a game application which is installed in the game-dedicated curation screen 1002 may be displayed brightly (for example, colored image). Further, a thumbnail image of a game application which is to be selected by the user may be displayed in three dimensions or may be displayed to be larger than a thumbnail image of a game application which is not selected.

When the electronic device 480 identifies whether a particular application (for example, the curation program) is installed based on information of the auxiliary electronic device 400 and the particular application is installed, the electronic device 480 receives input information of a button (for example, a "G" key) of the auxiliary electronic device and executes the particular application. When the particular application is not installed, the electronic device 480 receives input information of the button (for example, the "G" key) of the auxiliary electronic device and moves to a page through which the particular application can be downloaded. When the application is installed, the application is executed.

Figure 12:
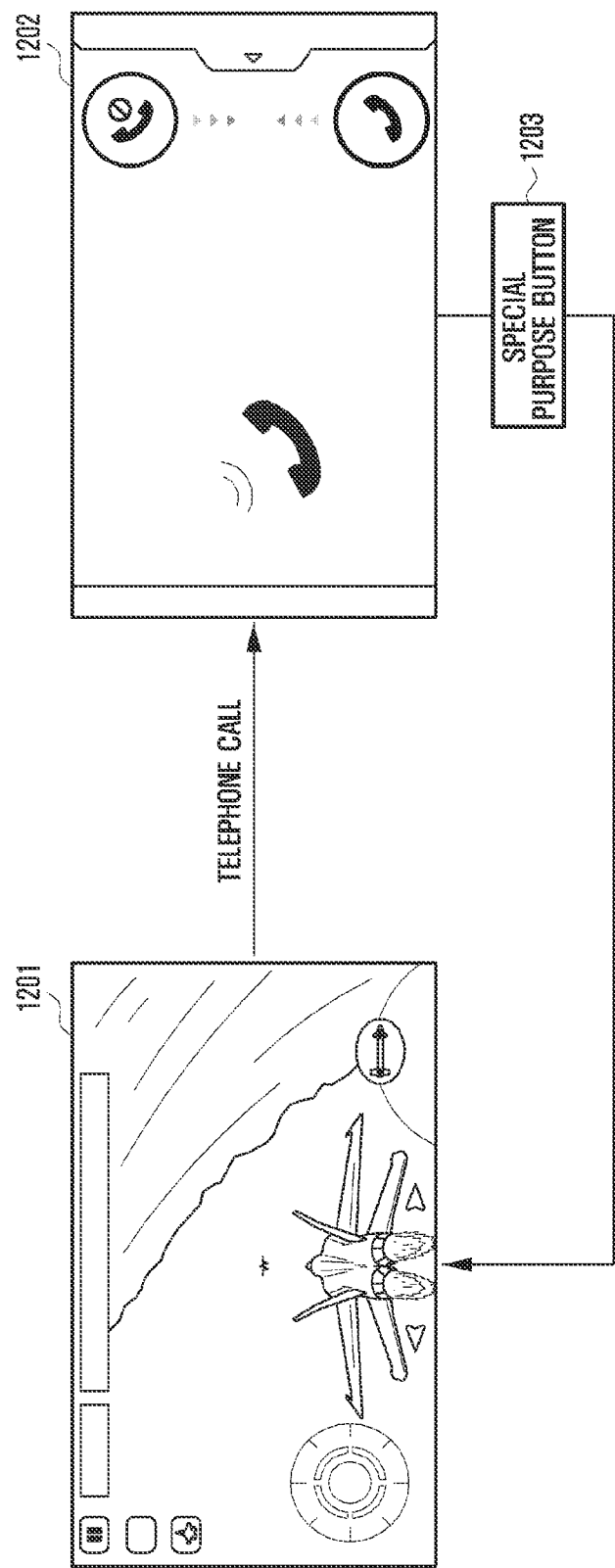
FIG. 12 illustrates an example of processing a case where an interruption is generated while an electronic device and an auxiliary electronic device interwork with each other according to various embodiments of the present disclosure.

FIG. 12 illustrates an example of processing a case where an interruption is generated while the electronic device and the auxiliary electronic device interwork with each other according to various embodiments of the present disclosure. For example, in a case where an interruption action of receiving a telephone call as shown in screen 1202 while the game application as shown in screen 1201 is executed is generated, when a user input signal through a special purpose button 1203 of the auxiliary electronic device 400 is transmitted, the corresponding call may be rejected or paused.

Figure 13:
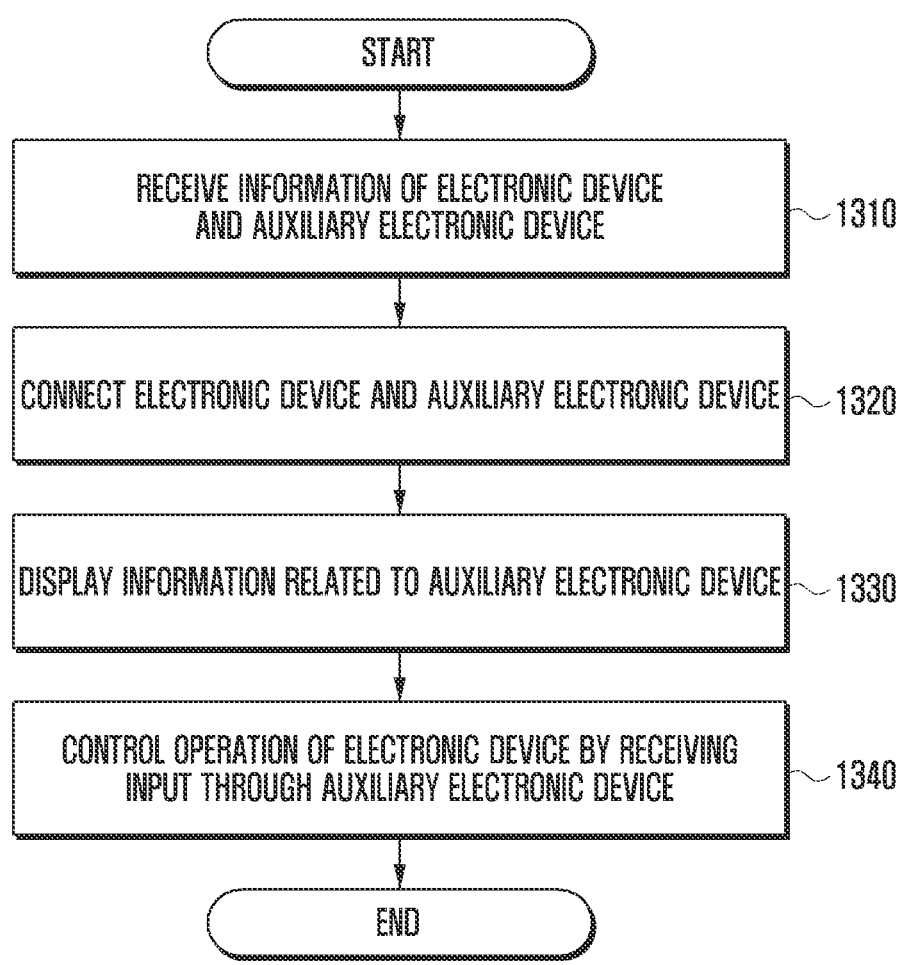
FIG. 13 is a flow diagram illustrating a connection and an operation control between an auxiliary electronic device and an electronic device according to various embodiments of the present disclosure.

FIG. 13 is a flow diagram illustrating a connection and an operation control between the auxiliary electronic device 400 and the electronic device 480 according to various embodiments of the present disclosure. In operation 1310, the auxiliary electronic device 400 and the electronic device 480 may transmit/receive information. The information may be transmitted/received through NFC. The information may include connection information by which the electronic device 480 and the auxiliary electronic device 400 can be connected to each other, but the information is not limited thereto and may further include various additional pieces of information.

In operation 1320, the auxiliary electronic device 400 and the electronic device 480 may be connected to each other based on the transmitted/received information. For example, the transmission/reception can be made through a communication module, such as Bluetooth, Infrared, WLAN, or the like. In operation 1330, the auxiliary electronic device 400 and the electronic device 480 may display information related to the auxiliary electronic device 400 to show it to the user based on the received information. For example, the related information may be displayed through the display of the electronic device 480. For example, the electronic device 480 grasps a value (for example, an ID of the auxiliary electronic device) by which the auxiliary electronic device 400 can be identified, based on the received information, uses the corresponding device, or displays optimized application information. For example, in order to display the related information, a particular application (for example, a curation program) may be used. In operation 1340, the auxiliary electronic device 400 and the electronic device 480 may control an operation of the electronic device 480 by receiving an input through the auxiliary electronic device 400. For example, a particular application of the electronic device 480 may be executed or particular operations may be processed within a pre-executed program.

Figure 14:
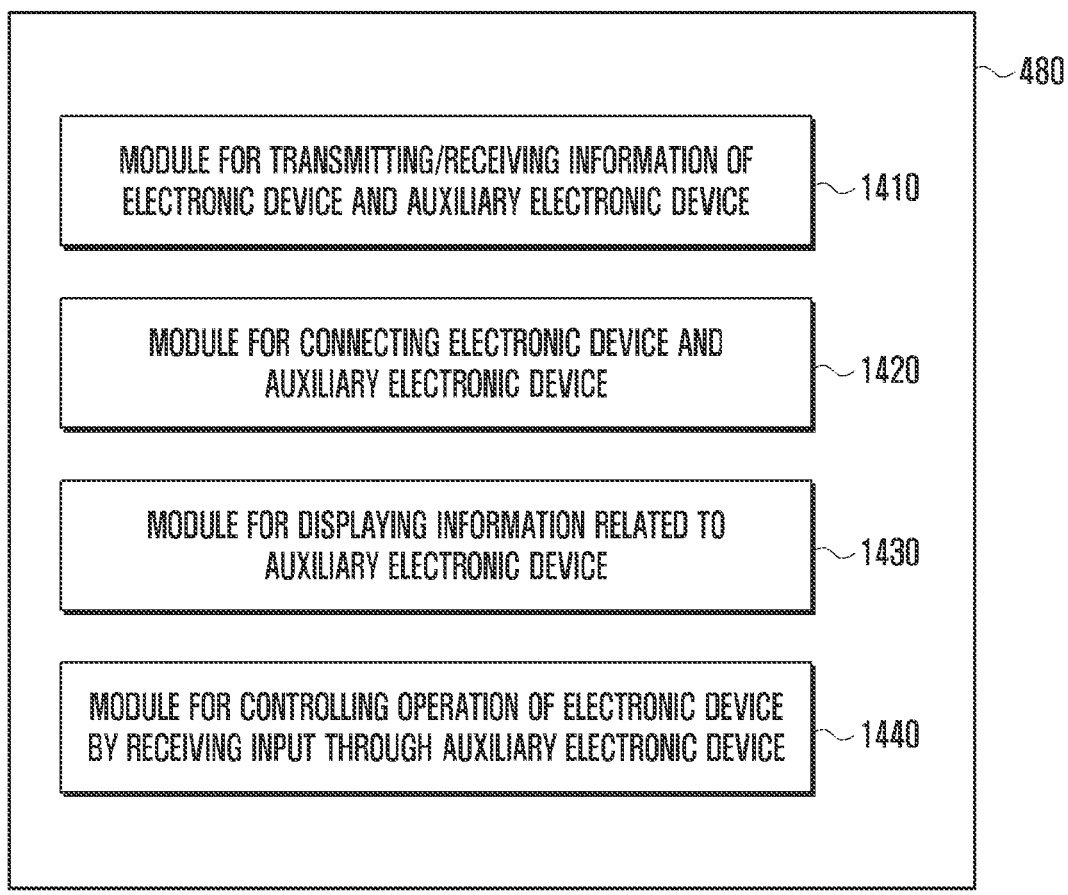
FIG. 14 illustrates detailed modules of an electronic device according to various embodiments of the present disclosure.

FIG. 14 illustrates detailed modules of the electronic device according to various embodiments of the present disclosure. The electronic device 480 can exchange information for a connection between the electronic device 480 and the auxiliary electronic device 400 through a module 1410 for transmitting/receiving information with the auxiliary electronic device. The electronic device 480 can be connected to the auxiliary electronic device through a module 1420. For example, the connection can be made using communication such as Bluetooth, infrared, WLAN or the like. The electronic device 480 may grasp a value of the auxiliary electronic device 400 through a module 1430 for displaying information related to the auxiliary electronic device, use the corresponding device, or display optimized application information. In order to display the related information, a particular application (for example, a curation program) may be used and the related information may be transmitted/received through the server to obtain additional information. An electronic device control module 1440 may control an operation of the electronic device 480 by receiving an input through the auxiliary electronic device 400.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of processing a user input signal by an electronic device, the method comprising:
   receiving, at the electronic device, a first user input signal input through a first button from an auxiliary electronic device, wherein the first user input signal comprises a value identifying the auxiliary electronic device;
   executing, at the electronic device, a first application according to the identifying of the auxiliary electronic device based on the first user input signal; and
   receiving, at the electronic device, a second user input signal through a second button from the auxiliary electronic device and executing a second application included in the first application,
   wherein the first application comprises a game-dedicated curation application installed in the electronic device,
   wherein the second application comprises a game application installed in the electronic device,
   wherein the first button comprises a special purpose button disposed on the auxiliary electronic device, and
   wherein the second button comprises another button disposed on the auxiliary electronic device which is not the special purpose button.

2. The method of claim 1, further comprising:
   determining whether the first application is installed; and
   when the first application is not installed, executing a first application download page.

3. The method of claim 1, further comprising:
   receiving the first user input signal through the first button from the auxiliary electronic device while the second application is executed; and
   displaying a dialog box for inquiring whether to end the second application being executed.

4. The method of claim 1, further comprising:
   receiving first the user input signal through the first button from the auxiliary electronic device while the second application is executed: and
   executing the first application.

5. The method of claim 1, further comprising, when a particular interruption of the electronic device is generated while the second application is executed, receiving the first user input signal through the first button and blocking the particular interruption of the electronic device.

6. The method of claim 1, wherein the receiving of the first user input signal through the first button from the auxiliary electronic device comprises receiving a Human Interface Device (HID) key code from the auxiliary electronic device.

7. The method of claim 1, further comprising, when the electronic device enters a locked screen or a power saving mode, receiving the first user input signal through the first button and releasing the locked screen or the power saving mode.

8. The method of claim 1, further comprising, when the first user input signal through the first button is received, blocking a user input through a user input unit disposed on the electronic device.

9. The method of claim 1, further comprising, when the first user input signal through the first button is received while the second application is executed, pausing or resuming the execution of the second application.

10. The method of claim 1, further comprising storing authentication information of a user for a download link of the first application.

11. The method of claim 1, wherein the value comprises a human interface device (HID) code.

12. The method of claim 11, wherein the HID code comprises an authentication code between devices for short-range wireless communication.

13. The method of claim 11, wherein the HID code comprises unique identification information of a manufacturer and a product.

14. An electronic device comprising:
   a communication unit;
   a memory unit;
   a display unit; and
   a processor,
   wherein the processor is configured to:
      receive a first user input signal input through a first button from an auxiliary electronic device through the communication unit, wherein the first user input signal identifies the auxiliary electronic device,
      execute a first application according to the identifying of the auxiliary electronic device based on the first user input signal,
      receive a second user input signal through a second button from the auxiliary electronic device, and
      execute a second application included in the first application,
   wherein the first application comprises a game-dedicated curation application installed in the electronic device,
   wherein the second application comprises a game application installed in the electronic device,
   wherein the first button comprises a special purpose button disposed on the auxiliary electronic device, and
   wherein the second button comprises another button disposed on the auxiliary electronic device which is not the special purpose button.

15. The electronic device of claim 14, wherein the processor is further configured to:
   determine whether the first application is installed, and
   execute a download page of the first application when the first application is not installed.

16. The electronic device of claim 14, wherein the processor is further configured to:
   receive the first user input signal through the first button from the auxiliary electronic device while the second application is executed, and
   control to display a dialog box for inquiring whether to end the second application being executed.

17. The electronic device of claim 14, wherein the processor is further configured to:

receive the first user input signal through the first button from the auxiliary electronic device through the communication unit while the second application is executed, and execute the first application.

18. The electronic device of claim 14, wherein, when a particular interruption is generated while the second application is executed, the processor is further configured to:

receive the first user input signal through the first button and block the particular interruption, and when the first user input signal through the first button is received while the second application is executed, pause or resume the execution of the second application.

19. The electronic device of claim 14, wherein the processor is further configured to:

receive a Human Interface Device (HID) key code from the auxiliary electronic device while receiving the first user input signal through the first button from the auxiliary electronic device through the communication unit, and control to store authentication information of a user for a download link of the first application in the memory unit.

20. The electronic device of claim 14, wherein, when the electronic device enters a locked screen or a power saving mode, the processor is further configured to:

receive, through the communication unit, the first user input signal through the first button, and release the locked screen or the power saving mode.

21. The electronic device of claim 14, wherein, when the first user input signal through the first button is received through the communication unit, the processor is further configured to block a user input through a user input unit disposed on the electronic device.

22. The electronic device of claim 14, wherein the value comprises a human interface device (HID) code.

23. The electronic device of claim 22, wherein the HID code comprises an authentication code between devices for short-range wireless communication.

24. The electronic device of claim 22, wherein the HID code comprises unique identification information of a manufacturer and a product.

* * * * *